(12) United States Patent
Kageyama

(10) Patent No.: US 9,482,898 B2
(45) Date of Patent: Nov. 1, 2016

(54) LIQUID CRYSTAL DISPLAY APPARATUS

(71) Applicant: KYOCERA Corporation, Kyoto-shi, Kyoto (JP)

(72) Inventor: Motoyasu Kageyama, Yasu (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 101 days.

(21) Appl. No.: 14/410,782

(22) PCT Filed: Feb. 4, 2014

(86) PCT No.: PCT/JP2014/052487
§ 371 (c)(1),
(2) Date: Dec. 23, 2014

(87) PCT Pub. No.: WO2014/132753
PCT Pub. Date: Sep. 4, 2014

(65) Prior Publication Data
US 2015/0205166 A1    Jul. 23, 2015

(30) Foreign Application Priority Data
Feb. 26, 2013  (JP) ................. 2013-035576

(51) Int. Cl.
*G02F 1/1335* (2006.01)
*G02F 1/1345* (2006.01)
*G02F 1/1333* (2006.01)

(52) U.S. Cl.
CPC ..... *G02F 1/133608* (2013.01); *G02F 1/13452* (2013.01); *G02F 1/133603* (2013.01); *G02F 2001/133317* (2013.01); *G02F 2001/133612* (2013.01)

(58) Field of Classification Search
CPC .............. G02F 1/133608; G02F 1/133603; G02F 2001/133612; G02F 2001/133317; G02F 1/13452
USPC .................................. 349/58, 150
See application file for complete search history.

(56) References Cited

U.S. PATENT DOCUMENTS

| | | | |
|---|---|---|---|
| 2003/0197111 A1* | 10/2003 | Morimoto | G06F 1/1616 248/694 |
| 2005/0151894 A1* | 7/2005 | Katsuda | G02F 1/133308 349/58 |

(Continued)

FOREIGN PATENT DOCUMENTS

| | | |
|---|---|---|
| JP | 2009-170246 A | 7/2009 |
| JP | 2012-237783 A | 12/2012 |

(Continued)

OTHER PUBLICATIONS

International Search Report, PCT/JP2014/052487, Apr. 3, 2014, 1 pg.
Chinese Office Action with English concise explanation, Chinese Patent Application No. 201480001529.3, Jun. 13, 2016, 10 pgs.

*Primary Examiner* — Hoan C Nguyen
(74) *Attorney, Agent, or Firm* — Volpe and Koenig, P.C.

(57) ABSTRACT

A liquid crystal display apparatus includes a liquid crystal panel; a light source device; a light source device accommodating member having a flat light source disposition portion, and a frame portion located in a periphery of the light source disposition portion to enclose the light source device; a frame-shaped member having an edge portion including a first part which overlays a non-display region and a second part located outside the non-display region, and an outer periphery part enclosing a side surface of a first substrate, a side surface of a second substrate, and the frame portion of the light source device accommodating member; and a spacer disposed between the frame portion and the outer periphery part, the light source device accommodating member, the frame-shaped member, and the spacer being fixed by a fixing member which penetrates the frame portion, the spacer, and the outer periphery part.

7 Claims, 9 Drawing Sheets

(56) References Cited

U.S. PATENT DOCUMENTS

| | | | |
|---|---|---|---|
| 2009/0237957 A1* | 9/2009 | Tsubaki | G02B 6/0068 362/615 |
| 2011/0051033 A1 | 3/2011 | Shimizu | |
| 2013/0194512 A1 | 8/2013 | Nishimoto et al. | |
| 2013/0235277 A1 | 9/2013 | Suwa et al. | |

FOREIGN PATENT DOCUMENTS

| | | |
|---|---|---|
| JP | 2013-156346 A | 8/2013 |
| WO | 2012/073943 A1 | 6/2012 |

* cited by examiner (a)

(b)

LIQUID CRYSTAL DISPLAY APPARATUS

TECHNICAL FIELD

The present invention relates to a liquid crystal display apparatus for use in various applications such as a portable phone, a digital camera, a portable game machine, and a portable information terminal.

BACKGROUND ART

A liquid crystal display apparatus includes: a liquid crystal panel including a first substrate having a display region and a non-display region, a second substrate disposed relative to the first substrate so that an inner main surface thereof and an inner main surface of the first substrate are opposite to each other, and a liquid crystal layer disposed between the first substrate and the second substrate; and a light source device disposed on an outer main surface side of the second substrate relative to the liquid crystal panel.

Further, the liquid crystal display apparatus includes: a light source device accommodating member provided with a light source disposition portion in which the light source device is disposed and with a frame portion enclosing the light source device; and a frame-shaped member provided with an edge portion containing a first part which overlays the non-display region and a second part located outside the non-display region and with an outer periphery part enclosing the liquid crystal panel and the frame portion of the light source device accommodating member (for example, see Japanese Unexamined Patent Publication JP-A 2009-170246).

In such a liquid crystal display apparatus, in a plan view thereof, a part of the frame portion in the light source device accommodating member overlays the second part of the edge portion in the frame-shaped member. Then, fixing members such as screws penetrate a part of the frame portion and the second part of the edge portion so that the light source device accommodating member and the frame-shaped member are fixed.

In recent years, size reduction is desired in liquid crystal display apparatuses. In particular, slim bezel is strongly desired.

However, in the above-mentioned liquid crystal display apparatus, the second part of the frame-shaped member located outside the liquid crystal panel is penetrated by the fixing members and hence areas for through holes need be ensured in the second part. This causes an increase in area of the second part and hence the area of the edge portion of the frame-shaped member easily becomes large. This has caused a problem of possibility of size increase in a bezel region of the liquid crystal, display apparatus.

The invention has been devised in view of the above-mentioned problem, and an object thereof is to provide a liquid crystal display apparatus capable of suppressing size increase in the bezel region.

SUMMARY OF INVENTION

According to the invention, a liquid crystal display apparatus includes: a liquid crystal panel including a first substrate having a display region located in a center part in an outer main surface thereof and a non-display region located outside the display region, a second substrate disposed relative to the first substrate so that an inner main surface of the first substrate and an inner main surface of the second substrate are opposite to each other, and a liquid crystal layer disposed between the first substrate and the second substrate so as to correspond to the display region of the first substrate; a light source device disposed on an outer main surface side of the second substrate relative to the liquid crystal panel; a light source device accommodating member having a light source disposition portion having a flat-plate shape in which the light source device is disposed, and a frame portion located in a periphery of the light source disposition portion so as to enclose the light source device; a frame-shaped member having an edge portion including a first part which overlays the non-display region and a second part located outside the non-display region, and an outer periphery part enclosing a side surface of the first substrate, a side surface of the second substrate, and the frame portion of the light source device accommodating member; and a spacer disposed between the frame portion and the outer periphery part, the light source device accommodating member, the frame-shaped member, and the spacer being fixed by a fixing member which penetrates the frame portion, the spacer, and the outer periphery part.

BRIEF DESCRIPTION OF DRAWINGS

FIG. 9 is diagrams showing a spacer, wherein FIG. 9(a) is a diagram in which the spacer is viewed from a frame-shaped member side; and FIG. 9(b) is a diagram in which the spacer is viewed from a light source device accommodating member side.

DESCRIPTION OF EMBODIMENTS

Figure 1:
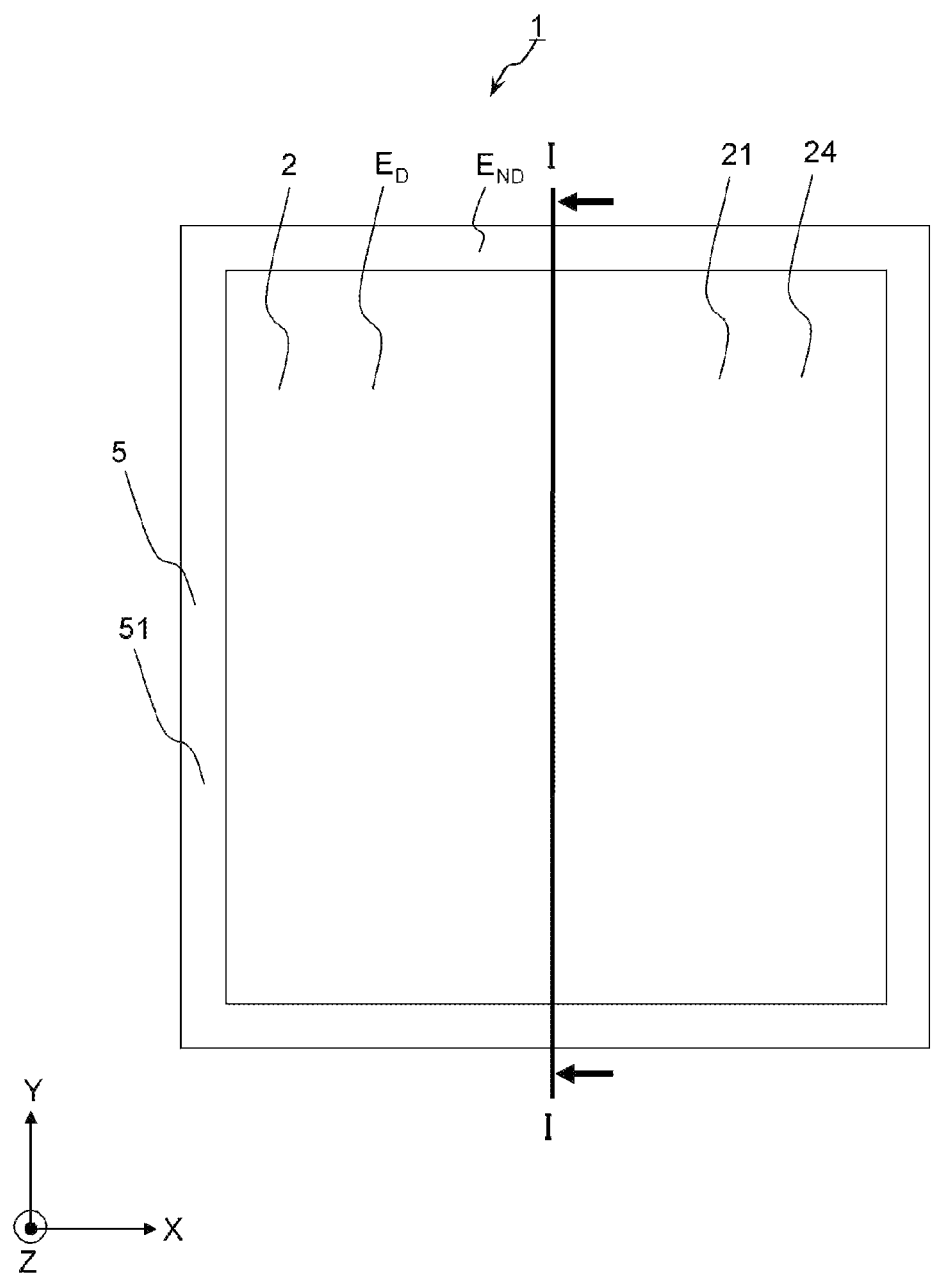
FIG. 1 is a plan view showing a liquid crystal display apparatus according to an embodiment of the invention.

A liquid crystal display apparatus 1 according to an embodiment of the invention is described below with reference to FIGS. 1 to 9.

The liquid crystal display apparatus 1 includes: a liquid crystal panel 2; a light source device 3 for emitting light toward the liquid crystal panel 2; a light source device accommodating member 4 for containing the light source device 3; a frame-shaped member 5 for enclosing the liquid crystal panel 2 and the light source device accommodating member 4; an inner frame-shaped member 6 for supporting the liquid crystal panel 2; a support member 7 for supporting the inner frame-shaped member 6; a spacer 8 disposed between the light source device accommodating member 4 and the frame-shaped member 5; a fixing member 9 for fixing the light source device accommodating member 4, the frame-shaped member 5, and the spacer 8; an optical sheet 10 disposed between the liquid crystal panel 2 and the light source device 3; a flexible circuit board 11 connected to the liquid crystal panel 2; and a drive circuit substrate 12 connected to the flexible circuit board 11.

In the liquid crystal panel 2, a first substrate 21 and a second substrate 22 are disposed opposite to each other, and a liquid crystal layer is disposed between the first substrate 21 and the second substrate 22. At the same time, a sealing member 23 for joining the first substrate 21 and the second substrate 22 is disposed so as to enclose the liquid crystal layer. Further, a first polarizing plate 24 and a second polarizing plate 25 are disposed in a manner of overlaying each other with the first substrate 21 and the second substrate 22 in between.

In the liquid crystal panel 2, an electric field is generated between a signal electrode and a common electrode so that orientation of liquid crystal molecules in the liquid crystal layer is controlled. By virtue of this, transmissivity for light from the light source device 3 is adjusted for each pixel so that an image is displayed on a display region $E_D$.

The first substrate 21 includes: a first main surface 21*a* provided with the display region $E_D$ for displaying an image in the center part; and a second main surface 21*b* located on the opposite side to the first main surface 21*a*. The first substrate 21 is formed of a material having a light transmitting property such as glass or plastics.

A color filter, a light-shielding film, a flattening film, an orientation film (not shown), and the like are disposed on the second main surface 21*b* of the first substrate 21.

The second substrate 22 includes: a first main surface 22*a* located opposite to the second main surface 21*b* of the first substrate 21; and a second main surface 22*b* located on the opposite side to the first main surface 22*a*. The second substrate 22 may be formed of a similar material to the first substrate 21.

Gate lines, gate insulation films, source lines, thin film transistors, signal electrodes, a common electrode (not shown), and so on are disposed on the first main surface 22*a* of the second substrate 22 so as to correspond to the display region $E_D$.

Here, the liquid crystal panel 2 of the embodiment adopts a so-called in-plane switching system that an electric field is generated between the signal electrodes and the common electrode disposed on one substrate among the pair of substrates so that the orientation of liquid crystal molecules in the liquid crystal layer is controlled. Further, although the in-plane switching system is adopted in the embodiment, employable systems are not limited to this and any kind of system may be adopted. For example, a vertical alignment system may be adopted.

Further, the liquid crystal panel 2 of the embodiment adopts an active matrix system utilizing thin film transistors. Instead, a passive matrix system may be adopted.

The liquid crystal layer is disposed between the first substrate 21 and the second substrate 22 so as to correspond to the display region $E_D$. The liquid crystal layer contains nematic liquid crystal or the like.

Figure 3:
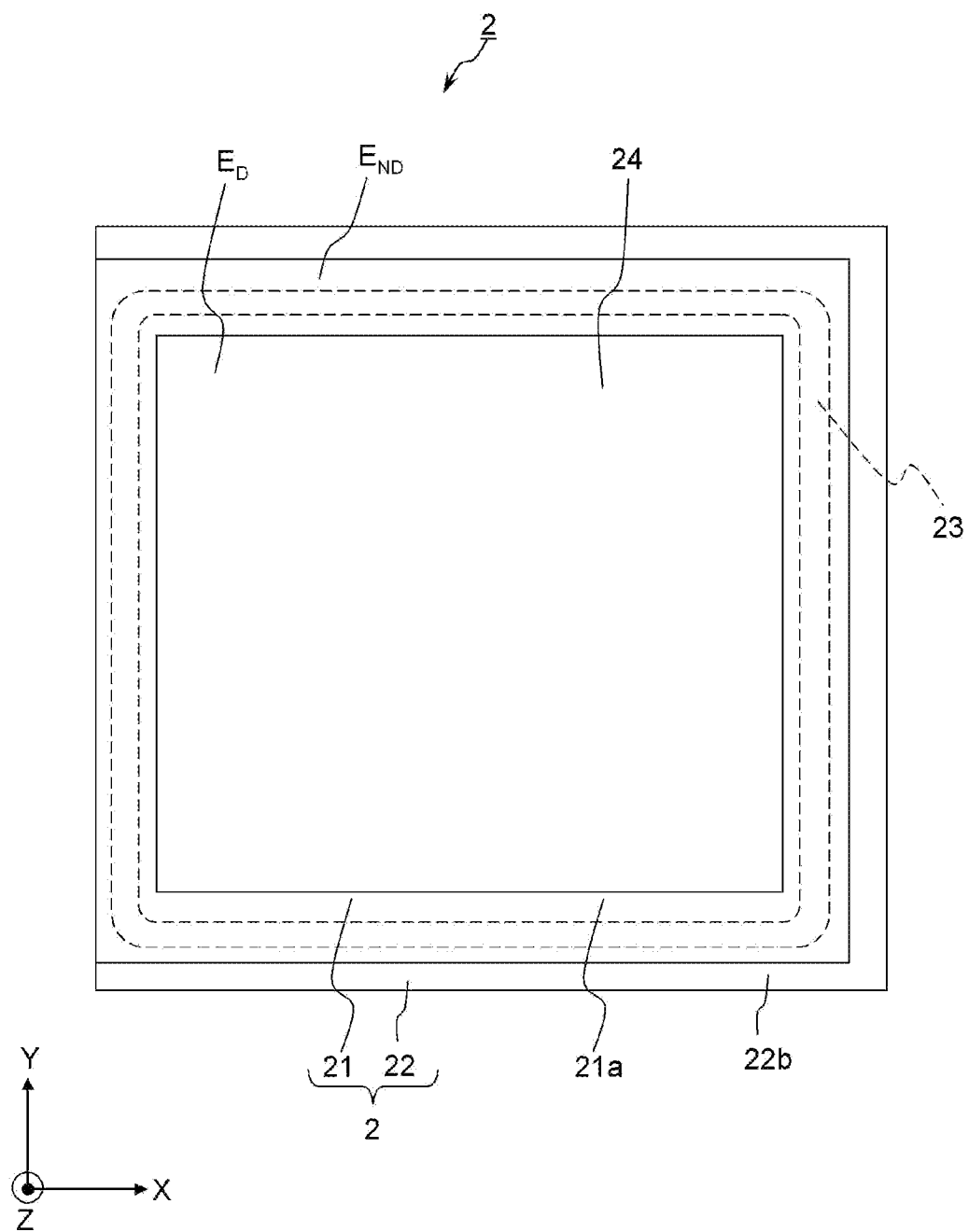
FIG. 3 is a plan view showing a liquid crystal panel.

The sealing member 23 has a function of bonding the first substrate 21 and the second substrate 22. Further, the sealing member 23 is disposed between the first substrate 21 and the second substrate 22. As shown in FIG. 3, the sealing member 23 is disposed so as to enclose the display region $E_D$ in a plan view thereof. The sealing member 23 is formed of epoxy resin or the like.

Figure 2:
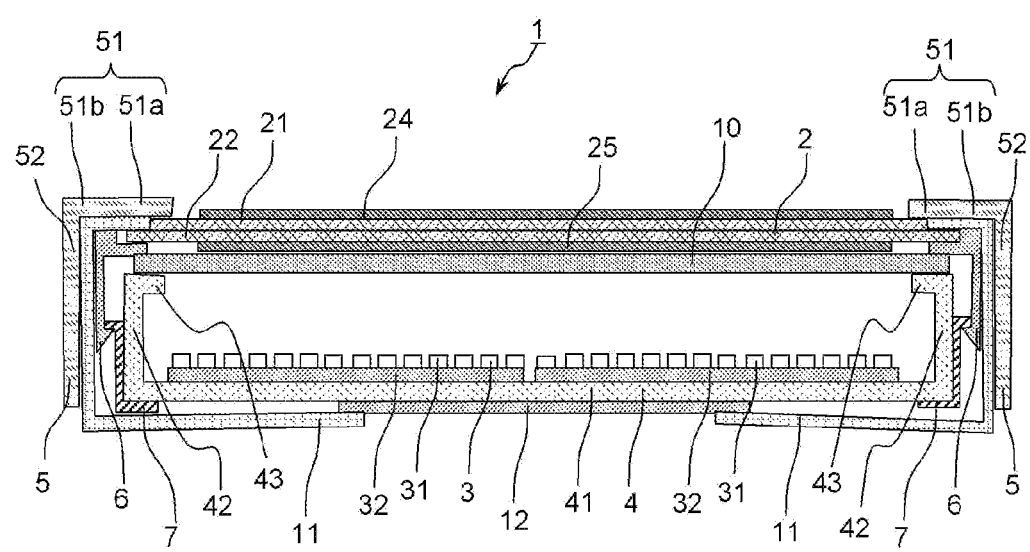
FIG. 2 is a sectional view taken along the line I-I in FIG. 1.
Figure 2:
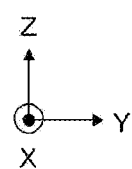

The first polarizing plate 24 has a function of selectively transmitting light having a predetermined oscillation direction. As shown in FIG. 2, the first polarizing plate 24 is disposed opposite to the first substrate 21 of the liquid crystal panel 2.

The second polarizing plate 25 has a function of selectively transmitting light having a predetermined oscillation direction. As shown in FIG. 2, the second polarizing plate 25 is disposed opposite to the second substrate 22.

The light source device 3 has a function of emitting light toward the liquid crystal panel 2. As shown in FIG. 2, the light source device 3 is disposed on the second main surface 22*b* side of the second substrate 22. Further, the light source device 3 of the embodiment includes a light source 31 and a mounting board 32.

The light source 31 has a function of generating light. A plurality of the light sources 11 are mounted on the mounting board 32. As shown in FIG. 2, the light sources 31 located on the mounting board 32 are aligned in the Y-direction. Further, a plurality of the mounting boards 32 on which the plurality of light sources 31 aligned in the Y-direction are mounted are aligned in the X-direction. That is, the light sources 31 are aligned in the Y-direction and in the X-direction. In the embodiment, LED elements are adopted as the light sources 31. However, employable configurations are not limited to this and, for example, EL (Electro-Luminescence) elements or the like may be adopted. Alternatively, line light sources such as cold cathode tubes may be adopted.

The plurality of light sources 31 are mounted on the mounting board 32. Wiring patterns are formed on the mounting boards 32, and the wiring patterns are connected to the light sources 31. When a voltage is applied through the wiring patterns to the light sources 31, light is emitted from the light sources 31.

Here, the light source device 3 of the embodiment adopts a direct type not requiring a light guide plate. Instead, a sidelight type utilizing a light guide plate may be adopted.

The optical sheet 10 is disposed between the liquid crystal panel 2 and the light source device 3. The optical sheet 10 of the embodiment includes a diffusion sheet, a prism sheet, and a luminance improvement sheet. The diffusion sheet has a function of homogenizing the luminance of the light from the light source device 3. The prism sheet is disposed on the diffusion sheet. The prism sheet has a function of refracting in the Z-direction the light having passed through the diffusion sheet. Further, the luminance improvement sheet is disposed on the prism sheet. The luminance improvement sheet has a function of reflecting to the liquid crystal panel 2 the light reflected by the liquid crystal panel 2 and then returned to the optical sheet 10.

The light source device accommodating member 4 has a function of accommodating the light source device 3. The light source device accommodating member 4 is disposed on the second main surface 22*b* side of the second substrate 22. The light source device accommodating member 4 includes a light source disposition portion 41, a frame portion 42, and a sheet disposition portion 43.

Figure 7:
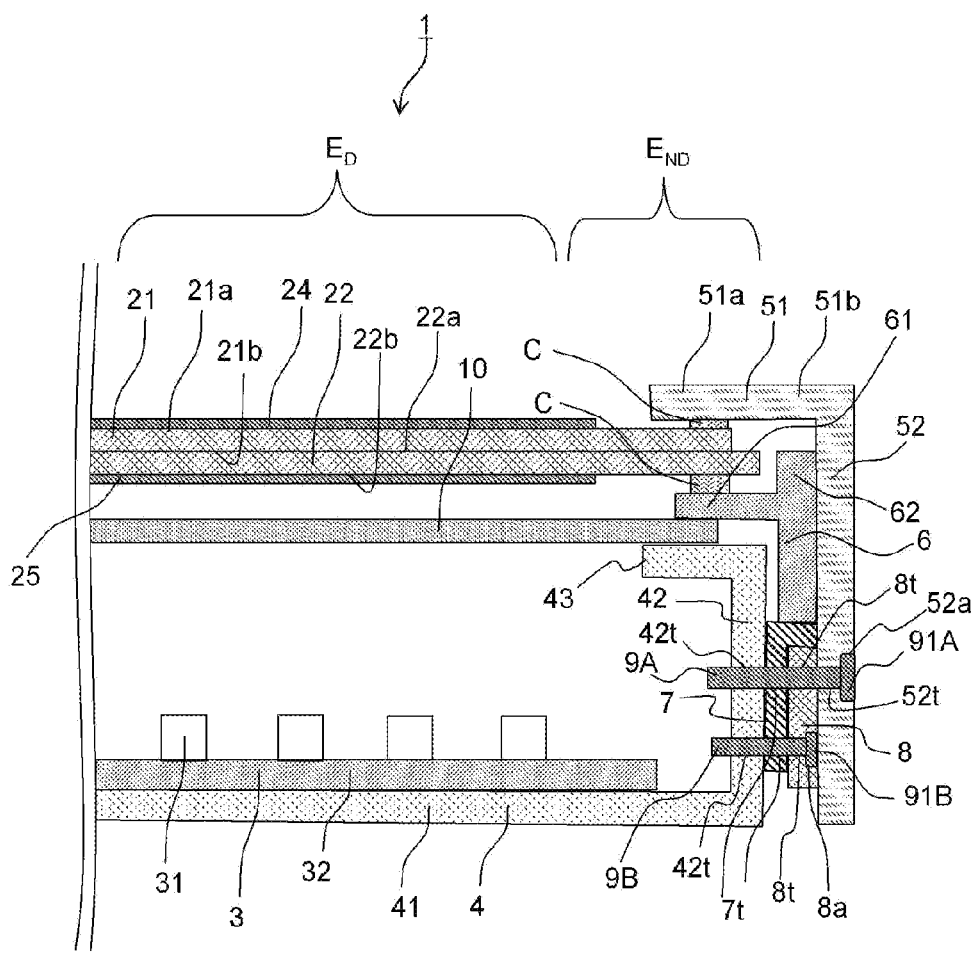
FIG. 7 is a sectional view taken along the line III-III in FIG. 4.

The light source disposition portion 41 is a plate-shaped part on which the light source device 3 is disposed. As shown in FIG. 2, the light source device 3 and the optical sheet 10 are disposed between the light source disposition portion 41 and the second main surface 22*b* of the second substrate 22. The frame portion 42 is a part located in a periphery of the light source device 3 so as to enclose the light source device 3. Here, as shown in FIG. 7, a through hole 42*t* penetrated by the fixing member 9 is formed in the frame portion 42. The sheet disposition portion 43 is a part on which an edge portion of the optical, sheet 10 is disposed, and then supports the optical sheet 10. As shown in FIG. 2, the sheet disposition portion 43 is bent from the frame portion 42 toward the X-direction. An edge portion of the optical sheet 10 and a part of the inner frame-shaped member 6 are disposed between the sheet disposition portion 43 and the second main surface 22b of the second substrate 22.

For example, employable materials for the light source device accommodating member 4 include: metallic materials such as steels, aluminum alloys, or magnesium alloys; and plastics such as glass fiber reinforced plastics or carbon fiber reinforced plastics.

The inner frame-shaped member 6 has a function of supporting the liquid crystal panel 2. The inner frame-shaped member 6 is disposed between the light source device accommodating member 4 and the frame-shaped member 5. Further, the inner frame-shaped member 6 is located on the liquid crystal panel 2 side with respect to the spacer 8. That is, the inner frame-shaped member 6 is located above the spacer 8.

Further, as shown in FIG. 7, a part of the inner frame-shaped member 6 of the embodiment is located on the spacer 8 with the support member 7 in between. That is, the spacer 8 supports the inner frame-shaped member 6 with the support member 7 in between. By virtue of this, the inner frame-shaped member 6 is supported by both of the support member 7 and the spacer 8. Thus, for example, even when a shock is applied to the liquid crystal display apparatus 1, the inner frame-shaped member 6 can be supported stably.

Figure 5:
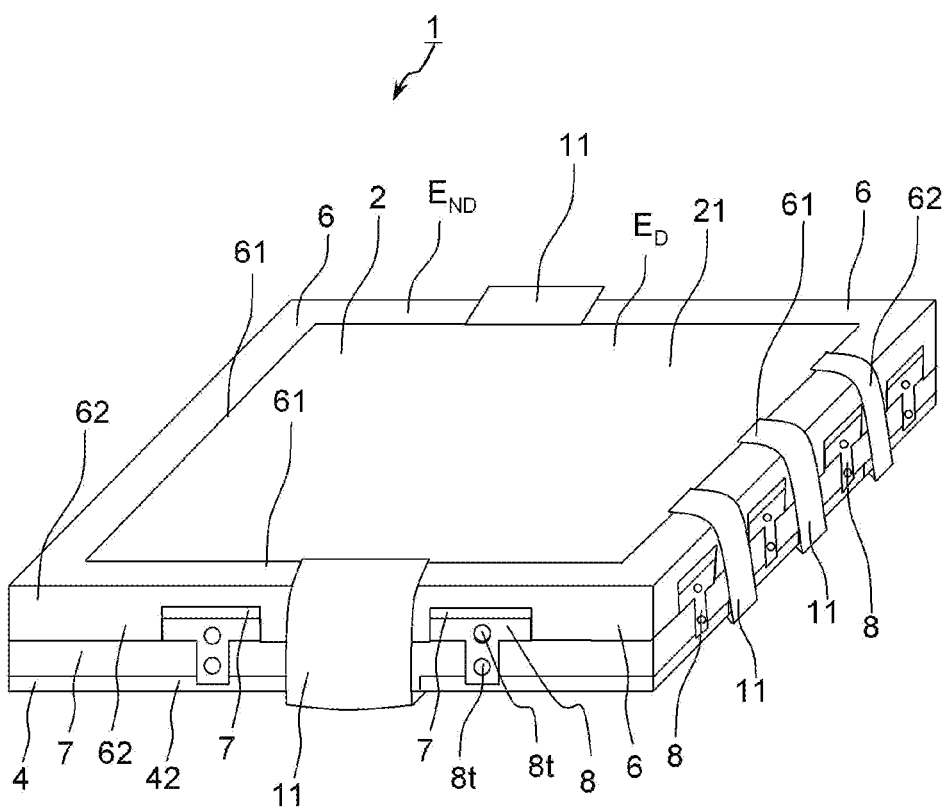
FIG. 5 is a perspective view in which a frame-shaped member has been removed from FIG. 4.
Figure 5:
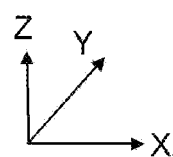
Figure 6:
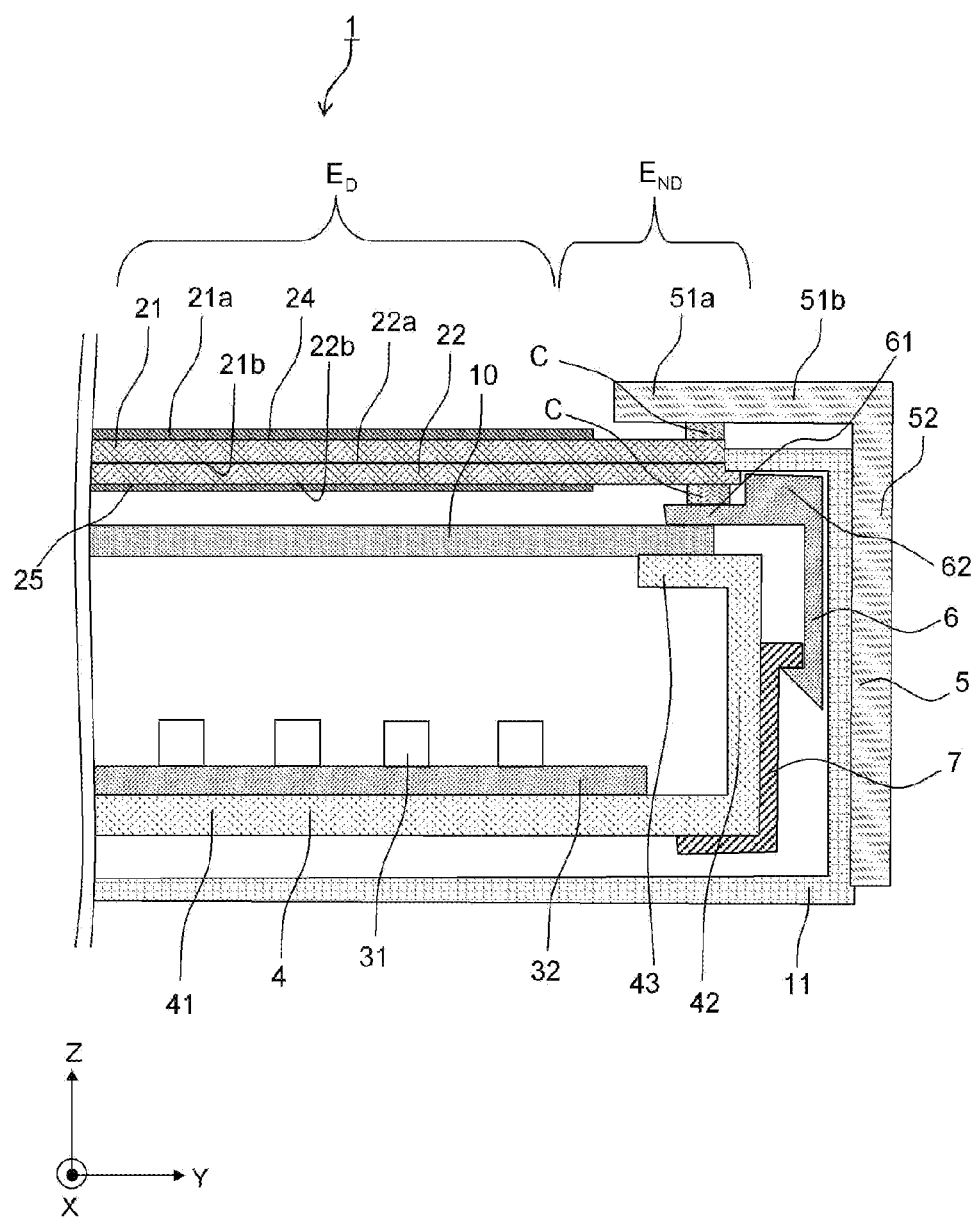
FIG. 6 is a sectional view taken along the line II-II in FIG. 4.
Figure 8:
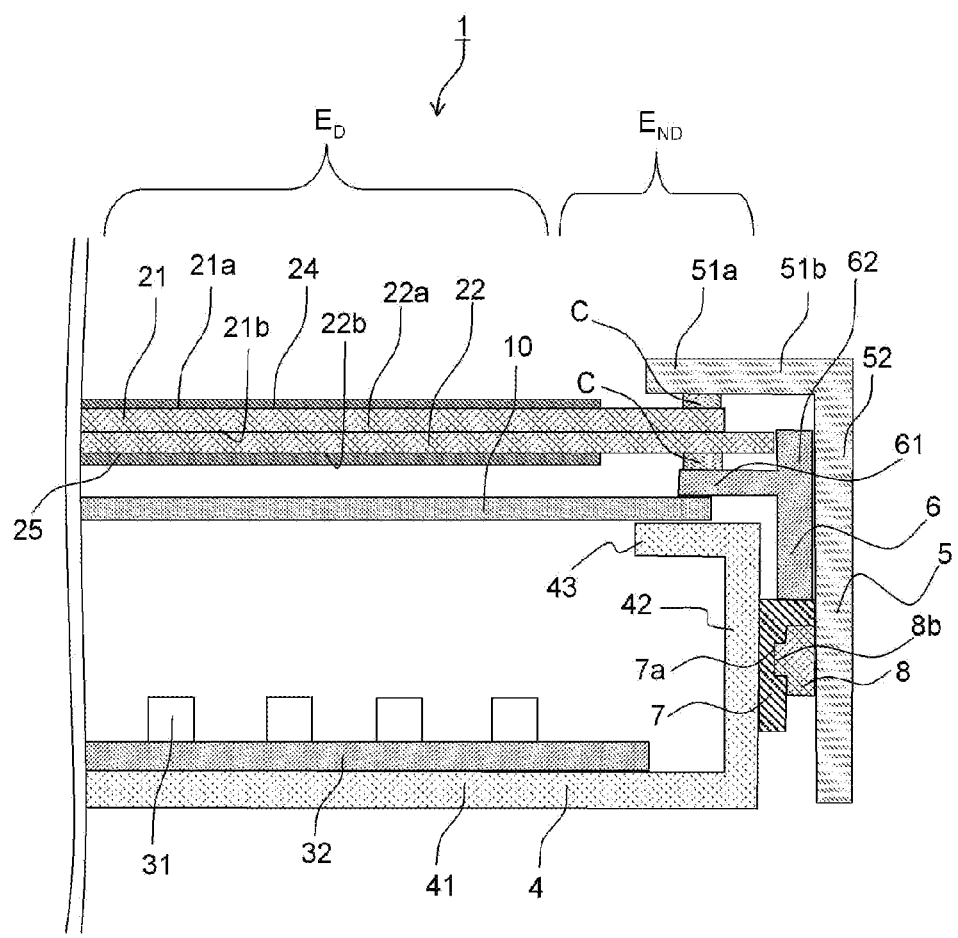
FIG. 8 is a sectional view taken along the line IV-IV in FIG. 4.

Further, as shown in FIG. 5, the inner frame-shaped member 6 includes a panel disposition portion 61 and a panel frame portion 62. The panel disposition portion 61 is a part on which an edge portion of the liquid crystal panel 2 is located. The panel disposition portion 61 supports the liquid crystal panel 2. Here, as shown in FIGS. 6, 7 and 8, a cushion C intervenes between the panel disposition portion 61 and the liquid crystal panel 2. Thus, even when a strong shock is applied to the liquid crystal display apparatus 1, the cushion C serves as a shock-absorbing material so as to reduce occurrence of damage in the liquid crystal panel 2.

The panel frame portion 62 is a part for enclosing the liquid crystal panel 2. Further, the panel frame portion 62 of the embodiment extends in the Y-direction and is in contact with the support member 7. Further, the panel frame portion 62 is disposed so as to enclose the frame portion 42 of the light source device accommodating member 4.

Figure 4:
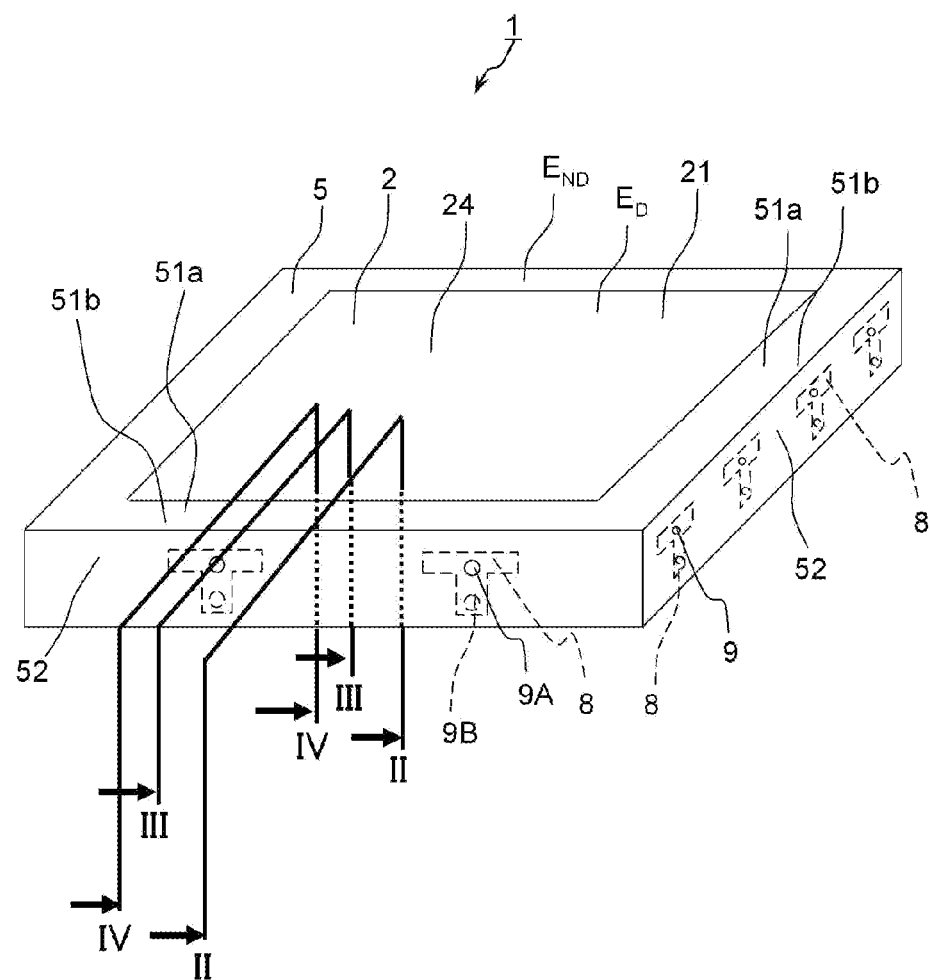
FIG. 4 is a perspective view showing the liquid crystal display apparatus of FIG. 1.

FIG. 6 is a sectional view taken along the line II-II in FIG. 4. That is, FIG. 6 is a sectional view of a portion of the side part of the liquid crystal display apparatus 1 where the spacer 8 is not disposed. As shown in FIG. 6, in the portion of the side part of the liquid crystal display apparatus 1 where the spacer 8 is not disposed, an end of the inner frame-shaped member 6 is fit onto an end of the support member 7. By virtue of this, the mutual position between the inner frame-shaped member 6 and the support member 7 is fixed. Here, as shown in FIG. 6, the flexible circuit board 11 is disposed in the portion of the side part of the liquid crystal display apparatus 1 where the spacer 8 is not disposed, in a space between the inner frame-shaped member 6 and the frame-shaped member 5 and between the support member 7 and the frame-shaped member 5.

For example, employable materials for the inner frame-shaped member 6 include: metallic materials such as steels, aluminum alloys, or magnesium alloys; and plastics such as thermoplastic engineering plastics, glass fiber reinforced plastics, or carbon fiber reinforced plastics.

The support member 7 has a function of supporting the inner frame-shaped member 6. The support member 7 is disposed between the frame portion 42 and the spacer 8. The support member 7 is disposed so as to enclose the frame portion 42 of the light source device accommodating member 4.

Further, one end of the support member 7 is located on an upper face of the spacer 8, and the inner frame-shaped member 6 is disposed on this one end. As shown in FIG. 6, the one end of the support member 7 is located between the inner frame-shaped member 6 and the frame portion 42 of the light source device accommodating member 4 and then fit onto the end of the inner frame-shaped member 6 so that the position between the inner frame-shaped member 6 and the support member 7 is fixed.

Further, as shown in FIG. 6, in the portion of the side part of the liquid crystal display apparatus 1 where the spacer 8 is not disposed, the other end of the support member 7 is in contact with and fixed to the back face of the light source disposition portion 41 of the light source device accommodating member 4.

FIG. 7 is a sectional view taken along the line III-III in FIG. 4 and FIG. 8 is a sectional view taken along the line IV-IV in FIG. 4. That is, FIGS. 7 and 8 are sectional views of a portion of the side part of the liquid crystal display apparatus 1 where the spacer 8 is disposed. Further, FIG. 7 is a sectional view of a portion where the spacer 8 extends in the Y-direction (a portion penetrated by the fixing member 9). FIG. 8 is a sectional view of a portion where the spacer 8 extends in the X-direction (a portion not penetrated by the fixing member 9).

Further, as shown in FIGS. 7 and 8, in the portion of the side part of the liquid crystal display apparatus 1 where the spacer 8 is disposed, the support member 7 is located between the frame portion 42 of the light source device accommodating member 4 and the spacer 8, and a part of the support member 7 is located also between the inner frame-shaped member 6 and the spacer 8. As shown in FIG. 5, above the spacer 8, the inner frame-shaped member 6 (the panel frame portion 62) and the spacer 8 are separated from each other. When a part of the support member 7 is disposed in a space between the inner frame-shaped member 6 (the panel frame portion 62) and the spacer 8, the positional relations between the inner frame-shaped member 6, the support member 7, and the spacer 8 can be determined.

Further, as shown in FIG. 8, a fitting part 7a is formed in the support member 7. Then, the fitting part 7a is fit onto a fitting part 8b of the spacer 8 so that fitting is achieved. Here, in the embodiment the fitting part 7a of the support member 7 is a recess.

Here, as shown in FIG. 7, a through hole 7t penetrated by the fixing member 9 is formed in the support member 7. That is, the support member 7 is penetrated and fixed by the fixing member 9 (9A and 9B).

For example, employable materials for the support member 7 include: metallic materials such as steels, aluminum alloys, or magnesium alloys; and plastics such as thermoplastic engineering plastics, glass fiber reinforced plastics, or carbon fiber reinforced plastics.

The frame-shaped member 5 has a function of protecting the outer periphery of the liquid crystal panel 2. Further, the frame-shaped member 5 pinches the liquid crystal panel 2 against the panel disposition portion 61 of the inner frame-shaped member 6 and thereby fixes the position of the liquid crystal panel 2. The frame-shaped member 5 includes an edge portion 51 and an outer periphery part 52.

The edge portion 51 includes a first part 51a which overlays a non-display region $E_{ND}$ and a second part 51b located outside the non-display region $E_{ND}$. The first part 51a of the edge portion 51 protects the non-display region EN. The second part 51b of the edge portion 51 is a portion located between the first part 51a and the outer periphery part 52. Here, as shown in FIGS. 6, 7 and 8, a cushion C is disposed between the first part 51a and the liquid crystal panel 2. Even when a strong shock is applied to the liquid crystal display apparatus 1, the cushion C serves as a shock-absorbing material so as to reduce occurrence of damage in the liquid crystal panel 2.

The outer periphery part 52 encloses the side surface of the first substrate 21, the side surface of the second substrate 22, and the frame portion 42 of the light source device accommodating member 4. As shown in FIG. 6 in the portion of the side part of the liquid crystal display apparatus 1 where the spacer 8 is not disposed, between the outer periphery part 52 and the frame portion 42 of the light source device accommodating member 4, the flexible circuit board 11 is located in addition to the inner frame-shaped member 6 and the support member 7. Further, as shown in FIGS. 7 and 8, in the portion of the side part of the liquid crystal display apparatus 1 where the spacer 8 is disposed, the spacer 8, the inner frame-shaped member 6, and the support member 7 are located.

Further, a through hole 52t is formed in the outer periphery part 52 and, at the same time, a notch 52a linked to the through hole 52t is formed. In the embodiment, a screw 9A serving as the fixing member is disposed in the through hole 52t so that a head 91A of the screw 9A is disposed in the notch 52a. That is, the head 91A of the screw 9A is embedded into the outer periphery part 52. The head 91A of the screw 9A enters the notch 52a and hence the head 91A of the screw 9A is not located outside the outer periphery part 52. Thus, size reduction can be achieved in the liquid crystal display apparatus 1. Here, in a case where a member having a head 91A, like a rivet, is adopted as the fixing member 9A, when the head 91A is disposed in the notch 52a, a similar effect to the above-mentioned one is obtained.

Figure 9:
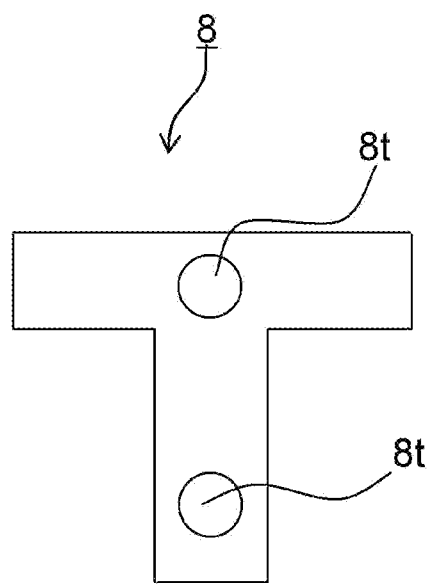
Figure 9:
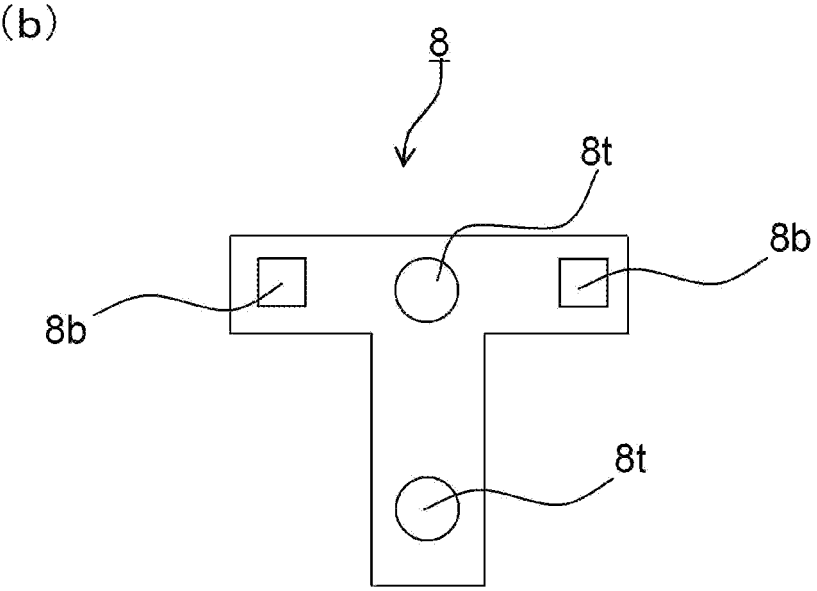

The spacer 8 is disposed between the frame portion 42 of the light source device accommodating member 4 and the outer periphery part 52 of the frame-shaped member 5. Further, the spacer 8 of the embodiment is in contact with the support member 7 and the outer periphery part 52 of the frame-shaped member 5. As shown in FIG. 9, the spacer 8 includes a portion extending in the X-direction and a portion extending the Y-direction. Here, the shape of the spacer 8 is not limited to a particular one. In the spacer 8, a through hole 8t in which the fixing member 9A is located, and a through hole 8t in which a fixing member 9B is located are formed.

Further, as shown in FIGS. 4 and 5, two spacers 8 of the embodiment are disposed in a side part in the shorter-side direction (the X-direction) of the liquid crystal display apparatus 1, and four spacers 8 are disposed in a side part in the longitudinal direction (the Y-direction). Further, these spacers 8 are disposed along the outer periphery (the X-direction and the Y-direction) of the liquid crystal panel. 2, at intervals, respectively. Here, the number of spacers 8 is not limited to this.

Further, as shown in FIG. 7, a notch 8a is formed in the spacer 8. The notch 8a is linked to the through hole 8t. A head 91B of the screw 9B serving as a second fixing member is located in the notch 8a. That is, the head 91B of the screw 9B is embedded into the spacer 8. The head 91B of the screw 9B enters the notch 8a and hence the head 91B of the screw 9B is not located outside the spacer 8. Thus, size reduction can be achieved in the liquid crystal display apparatus 1. Here, in a case where a member having a head 91B, like a rivet, is adopted as the fixing member 9B, when the head 91B is disposed in the notch 8a, a similar effect to the above-mentioned one is obtained.

Further, as shown in FIG. 9(b), two fitting parts 8b are formed in a surface on the light source device accommodating member 4 side of the spacer 8. As shown in FIG. 8, the fitting part 8a is fit into the fitting part 7a formed in the support member 7. By virtue of this, the position of the spacer 8 relative to the support member 7 can be determined.

Further, in the embodiment, the fitting part 8b of the spacer 8 is a protrusion. If a recess serving as the fitting part 8b were formed in the spacer 8, a possibility would arise that the strength is reduced in the spacer 8 having a smaller size than the support member 7. In contrast, when the fitting part 8b of the spacer 8 is a protrusion, reduction of the strength in the spacer 8 can be suppressed.

For example, employable materials for the spacer 8 include plastics such as thermoplastic engineering plastics, glass fiber reinforced plastics, or carbon fiber reinforced plastics.

The fixing member 9 has a function of fixing the frame-shaped member 5, the spacer 8, and the light source device accommodating member 4. One fixing member 9A penetrates the outer periphery part 52 of the frame-shaped member 5, the spacer 8, and the frame portion 42 of the light source device accommodating member 4. Further, the other one fixing member 9B penetrates the spacer 8 and the frame portion 42 of the light source device accommodating member 4. Here, in the embodiment, the fixing members 9A and 9B penetrate the support member 7 too. Further, the fixing member 9 of the embodiment is a screw. In the fixing member 9 of the embodiment, a screw thread serving as a head is formed. Further, a screw thread serving as a head is formed also in the inner surfaces of the through holes 52t, 8t, 42t, and 7t. Further, the fixing member 9 is not limited to a screw as long as the fixing member can penetrate and fix the components. For example, a rivet or the like may be employed.

For example, employable materials for the fixing member 9 include: metallic materials such as steels, aluminum alloys, or magnesium alloys; and plastics such as glass fiber reinforced plastics or carbon fiber reinforced plastics.

In the liquid crystal display apparatus 1, the light source device accommodating member 4, the frame-shaped member 5 and the spacer 8 are fixed by the fixing member 9A which penetrates the frame portion 42, the spacer 8, and the outer periphery part 52. That is, the fixing member 9A fixes the light source device accommodating member 4 and the frame-shaped member 5 without penetrating the second part 51b of the edge portion 51 of the frame-shaped member 5. This avoids the necessity of forming a through hole in the second part 51b of the edge portion 51 so that the area of the second part 51b of the edge portion 51 can be reduced and hence the size of the bezel region of the liquid crystal display apparatus 1 can be reduced.

Further, in the liquid crystal display apparatus 1, the spacer 8 is disposed between the frame portion 42 of the light source device accommodating member 4 and the outer periphery part 52 of the frame-shaped member 5. Thus, the interval between the frame portion 42 and the outer periphery part 52 can be maintained at constant by the spacer 8. Accordingly, for example, even when a shock is applied to the liquid crystal display apparatus 1, the interval between the light source device accommodating member 4 and the frame-shaped member 5 can be maintained at constant. Further, the fixing member 9A penetrates the outer periphery part 52, the spacer 8 and the frame portion 42. As a result, the fixing member 9A is in contact with the inner surface of the through hole 52t of the outer periphery part 52 and the inner surface of the through hole 42t of the frame portion 42 as well as the inner surface of the through hole 8t of the spacer 8. This causes an increase in the area of contact of the fixing member 9A to the member. Thus, the positions of the light source device accommodating member 4 and the frame-shaped member 5 are firmly fixed by the fixing member 9A and hence, for example, even when a shock is applied to the liquid crystal display apparatus 1, the positional relation between the light source device accommodating member 4 and the frame-shaped member 5 can be maintained. This improves the mechanical strength of the liquid crystal display apparatus 1.

Further, in the liquid crystal display apparatus 1, the fixing member 9A penetrates the support member 7. By virtue of this, the fixing member 9A is also in contact with the inner surface of the through hole 7t of the support member 7. This causes an increase in the area of contact of the fixing member 9A to the member. Thus, the positions of the light source device accommodating member 4 and the frame-shaped member 5 are firmly fixed by the fixing member 9A and hence, for example, even when a shock is applied to the liquid crystal display apparatus 1, the positional relation between the light source device accommodating member 4 and the frame-shaped member 5 can be maintained. This improves the mechanical strength of the liquid crystal display apparatus 1.

Further, in the liquid crystal display apparatus 1, the fixing member 9B penetrates the frame portion 42 of the light source device accommodating member 4 and the spacer 8. By virtue of this, the fixing member 9B is in contact with the inner surface of the through hole 42t of the frame portion 42 and the inner surface of the through hole 8t of the spacer 8. Thus, the positions of the light source device accommodating member 4 and the spacer 8 are firmly fixed by the fixing member 9B and hence, for example, even when a shock is applied to the liquid crystal display apparatus 1, the positional relation between the light source device accommodating member 4 and the spacer 8 can be maintained. This improves the mechanical strength of the liquid crystal display apparatus 1.

Further, in the liquid crystal display apparatus 1, the fixing member 9B penetrates the support member 7. By virtue of this, the fixing member 9B is also in contact with the inner surface of the through hole 7t of the support member 7. This causes an increase in the area of contact of the fixing member 9B to the member. Thus, the positions of the light source device accommodating member 4 and the spacer 8 are firmly fixed by the fixing member 9B and hence, for example, even when a shock is applied to the liquid crystal display apparatus 1, the positional relation between the light source device accommodating member 4 and the spacer 8 can be maintained. This improves the mechanical strength of the liquid crystal display apparatus 1.

The flexible circuit board 11 has a function of electrically connecting the liquid crystal panel 2 and the drive circuit substrate 12. One end of the flexible circuit board 11 is connected to the liquid crystal panel 2 so as to be opposite to the first substrate 21. Then, the other end is connected to the drive circuit substrate 12. The flexible circuit board 11 is disposed between the light source device accommodating member 4 and the frame-shaped member 5 and on the back face side of the light source disposition portion 41. The flexible circuit board 11 includes a base, a wiring pattern, and circuit electrode terminals.

The base has a function of supporting a plurality of wiring patterns and a plurality of circuit electrode terminals. The base is formed of an insulating material having flexibility, like polyimide resin. Thus, the flexible circuit board 11 can be bent flexibly. The plurality of wiring patterns and the plurality of circuit electrode terminals are formed of copper or the like.

As shown in FIGS. 2, 5 and 6, the flexible circuit board 11 is bent from the liquid crystal panel 2 and goes around to the back face of the light source disposition portion 41 of the light source device accommodating member 4. Then, the flexible circuit board 11 is connected to the drive circuit substrate 12 disposed outside the light source disposition portion 41.

The flexible circuit board 11 disposed between the frame portion 42 and the outer periphery part 52 is located between the spacers 8. That is, as shown in FIGS. 5 and 6, the flexible circuit board 11 is located in a portion of the side part of the liquid crystal display apparatus 1 where the spacer 8 is not disposed. If the flexible board 11 were disposed in a portion where the spacer 8 is disposed, the thickness of the flexible board 11 would be added to the thickness of the spacer 8 so that a possibility would arise that the bezel region of the liquid crystal display apparatus 1 becomes large. In contrast, when the flexible circuit board 11 is disposed in the portion of the side part of the liquid crystal display apparatus 1 where the spacer 8 is not disposed, the space formed in the portion of the side part of the liquid crystal display apparatus 1 where the spacer 8 is not disposed can be utilized effectively so that the flexible board 11 can be disposed. This suppresses a size increase in the bezel region of the liquid crystal display apparatus 1.

The drive circuit substrate 12 has a function of driving the liquid crystal panel 2. As shown in FIG. 2, the drive circuit substrate 12 is disposed on the back face of the light source disposition portion 41 of the light source device accommodating member 4. For example, the drive circuit substrate 12 includes a power supply, resistors, transistors, coils, integrated circuits (ICs), and the like. The drive circuit substrate 12 is electrically connected to the flexible circuit board 11.

The invention is not limited to the above-mentioned particular embodiment. That is, various modifications and improvements are possible within the scope of the invention.

REFERENCE SIGNS LIST 1, 1A: Liquid crystal display apparatus
2: Liquid crystal panel
$E_D$: Display region
$E_{ND}$: Non-display region
21: First substrate
21a: First main surface (Outer main surface)
21b: Second main surface (Inner main surface)
22: Second substrate
22a: First main surface (Outer main surface)
22b: Second main surface (Inner main surface)
23: Sealing member
24: First polarizing plate
25: Second polarizing plate
3: Light source device
31: Light source
32: Mounting board
4: Light source device accommodating member
41: Light source disposition portion
42: Frame portion
42t: Through hole
43: Sheet disposition portion
5: Frame-shaped member
51: Edge portion 51a: First part
51b: Second part
52: Outer periphery part
52t: Through hole
52a: Notch
6: Inner frame-shaped member
61: Panel disposition portion
62: Panel frame portion
7: Support member
7t: Through hole
7a: Recess (Fitting part)
83: Spacer
8t: Through hole
8a: Notch
8b: Protrusion (Fitting part)
9, 9A, 9B: Fixing member
91A, 91B: Head
10: Optical sheet
11: Flexible circuit board
12: Drive circuit substrate

The invention claimed is:

1. A liquid crystal display apparatus, comprising:
a liquid crystal panel including a first substrate having a display region located in a center part in an outer main surface thereof and a non-display region located outside the display region, a second substrate disposed relative to the first substrate so that an inner main surface of the first substrate and an inner main surface of the second substrate are opposite to each other, and a liquid crystal layer disposed between the first substrate and the second substrate to correspond to the display region of the first substrate;
a light source device disposed on an outer main surface side of the second substrate relative to the liquid crystal panel;
a light source device accommodating member having a light source disposition portion having a flat-plate shape in which the light source device is disposed, and a frame portion located in a periphery of the light source disposition portion to enclose the light source device;
a frame-shaped member having an edge portion including a first part which overlays the non-display region and a second part located outside the non-display region, and an outer periphery part enclosing a side surface of the first substrate, a side surface of the second substrate, and the frame portion of the light source device accommodating member;
a spacer disposed between the frame portion and the outer periphery part; and
a flexible circuit board which is disposed between the light source device accommodating member and the frame-shaped member and on a back face side of the light source disposition portion, one end of the flexible circuit board being connected to the liquid crystal panel, the light source device accommodating member, the frame-shaped member, and the spacer being fixed by a fixing member which penetrates the frame portion, the spacer, and the outer periphery part,
a plurality of the spacers being disposed between the frame portion and the outer periphery part along an outer periphery of the liquid crystal panel, at intervals, respectively, and
the flexible circuit board located between the frame portion and the outer periphery part being disposed between the spacers.

2. The liquid crystal display apparatus according to claim 1, wherein the fixing member has a head which is embedded into the outer periphery part of the frame-shaped member.

3. A liquid crystal display apparatus, comprising:
a liquid crystal panel including a first substrate having a display region located in a center part in an outer main surface thereof and a non-display region located outside the display region, a second substrate disposed relative to the first substrate so that an inner main surface of the first substrate and an inner main surface of the second substrate are opposite to each other, and a liquid crystal layer disposed between the first substrate and the second substrate to correspond to the display region of the first substrate;
a light source device disposed on an outer main surface side of the second substrate relative to the liquid crystal panel;
a light source device accommodating member having a light source disposition portion having a flat-plate shape in which the light source device is disposed, and a frame portion located in a periphery of the light source disposition portion to enclose the light source device;
a frame-shaped member having an edge portion including a first part which overlays the non-display region and a second part located outside the non-display region, and an outer periphery part enclosing a side surface of the first substrate, a side surface of the second substrate, and the frame portion of the light source device accommodating member;
a spacer disposed between the frame portion and the outer periphery part;
an inner frame-shaped member disposed between the frame portion and the outer periphery part on a liquid crystal panel side with respect to the spacer, the inner-frame-shaped member supporting the liquid crystal panel; and
a support member disposed between the frame portion and the spacer, the support member supporting the inner frame-shaped member,
the light source device accommodating member, the frame-shaped member, and the spacer being fixed by a fixing member which penetrates the frame portion, the spacer, and the outer periphery part, and
together with the frame portion, the spacer, and the outer periphery part, the support member being penetrated and fixed by the fixing member.

4. The liquid crystal display apparatus according to claim 3, wherein
a part of the support member is located on an upper face of the spacer, and
the inner frame-shaped member is located on the part of the support member.

5. The liquid crystal display apparatus according to claim 3, wherein
the spacer and the support member have fitting parts, and the spacer and the support member fit onto each other in the fitting parts.

6. The liquid crystal display apparatus according to claim 5, wherein
the fitting part of the spacer is a protrusion and the fitting part of the support member is a recess.

7. The liquid crystal display apparatus according to claim 3, wherein
the light source device accommodating member, the spacer, and the support member are fixed by a second fixing member which penetrates the frame portion, the spacer, and the support member, and the second fixing member has a head which is embedded into the spacer.

* * * * *